United States Patent [19]

Imahashi et al.

[11] Patent Number: 5,583,172
[45] Date of Patent: Dec. 10, 1996

[54] FLAME RETARDANT AID, FLAME RETARDANT AND FLAME-RETARDANT COMPOSITION

[75] Inventors: Takeshi Imahashi, Nagao-machi; Akira Okada; Tomoko Abe, both of Takamatsu, all of Japan

[73] Assignee: Kyowa Chemical Industry Co., Ltd., Kagawa-ken, Japan

[21] Appl. No.: 322,722

[22] Filed: Oct. 4, 1994

Related U.S. Application Data

[63] Continuation of Ser. No. 27,058, Mar. 5, 1993, abandoned.

[30] Foreign Application Priority Data

Mar. 16, 1992 [JP] Japan ..................... 4-090184

[51] Int. Cl.⁶ .................................. C08K 3/22
[52] U.S. Cl. .................. 524/435; 524/398; 524/417; 524/423; 524/431; 524/436; 524/437
[58] Field of Search ..................... 524/417, 423, 524/431, 435, 398, 436, 437

[56] References Cited

U.S. PATENT DOCUMENTS

| | | | |
|---|---|---|---|
| 3,240,552 | 3/1966 | Joyner et al. | 524/398 |
| 3,677,999 | 7/1972 | Denk et al. | 524/437 |
| 3,875,107 | 4/1975 | Nouvertné et al. | |
| 3,935,157 | 1/1976 | Schiller et al. | 524/431 |
| 3,962,163 | 6/1976 | Dickens | 524/431 |
| 3,962,177 | 6/1976 | Dickens | 524/398 |
| 3,965,068 | 6/1976 | Dickens | 524/431 |
| 3,968,064 | 7/1976 | Dickens | 524/431 |
| 3,975,356 | 8/1976 | Dickens | 524/435 |
| 3,975,359 | 8/1976 | Dickens | 524/435 |
| 4,053,454 | 10/1977 | Kroenke | 524/431 |
| 4,067,847 | 1/1978 | Yui | 524/436 |
| 4,147,690 | 4/1979 | Rich | 524/436 |
| 4,791,160 | 12/1988 | Kato et al. | 524/435 |
| 5,013,782 | 5/1991 | Tateno | 524/435 |

FOREIGN PATENT DOCUMENTS

| | | |
|---|---|---|
| 498566 | 8/1992 | European Pat. Off. . |
| 63-118350 | 5/1988 | Japan . |
| 355186 | 10/1972 | U.S.S.R. . |

OTHER PUBLICATIONS

Database WPI, JP-A-58 066 751, Apr. 19, 1983, Abstract.
Database WPI, JP-A-2 016 136, Jan. 1990, Abstract.
Database WPI, JP-A-63 128 040, May 31, 1988, Abstract.
Database WPI, JP-A-1 081 857, Mar. 1989, Abstract.
Database WPI, JP-A-52 026 556, Feb. 1977, Abstract.
Database WPI, JP-A-51 112 855, Oct. 6, 1976, Abstract.

*Primary Examiner*—Veronica P. Hoke
*Attorney, Agent, or Firm*—Wenderoth, Lind & Ponack

[57] ABSTRACT

A flame retardant aid which serves to provide synthetic resins with sufficient flame retardancy when used together with a decreased amount of aluminum or magnesium hydroxide, and serves to give resin compositions which have color stability against heat and can be almost freely colored. The flame retardant aid is at least one compound selected from the group consisting of:

a composite metal compound of the formula (A), $$Mg_{1-(x+y)}Ni_xCo_y(OH)_2 \qquad (A)$$

or a composite metal compound of the formula (B), $$Mg_{1-(x+y)}Ni_xCo_yO \qquad (B)$$

wherein x and y are defined in the specification,
nickel halides,
ammonium-containing salts of nickel,
inorganic acid salts of nickel, and
fatty acid salts of nickel.

5 Claims, No Drawings

FLAME RETARDANT AID, FLAME RETARDANT AND FLAME-RETARDANT COMPOSITION

This application is a continuation of now abandoned application Ser. No. 08/027,058, filed Mar. 5, 1993.

FIELD OF THE INVENTION

The present invention relates to a flame retardant aid and flame retardant for synthetic resins and a flame-retardant resin composition.

DESCRIPTION OF RELATED ART

Synthetic resins and rubbers (hereinafter referred to as "synthetic resins") are flammable themselves, and for obtaining flame-retarded synthetic resins to prevent various disasters caused by fire, a variety of proposals have been made. For example, there have been proposed flame-retardant resin compositions prepared by incorporating an organic halide or a combination of an organic halide with antimony trioxide in to synthetic resins. However, these flame-retardant resin compositions have the following problems. That is, these resin compositions corrode a molding machine, and generate a large amount of smoke. The smoke is toxic and corrosive.

As flame retardants which generate no toxic or corrosive smoke, metal hydroxides such as aluminum hydroxide and magnesium hydroxide have been proposed. For imparting synthetic resins with sufficient flame retardancy, however, it is required to incorporate the metal hydroxide in a large amount. There has been proposed a method of decreasing the amount of the above flame retardant, in which a flame retardant aid such as carbon black, red phosphorus or an acrylic fiber is used in combination with the metal hydroxide.

For imparting the synthetic resins with sufficient flame retardancy by means of the metal hydroxide, the amount or the required metal hydroxide is several times as large as the amount of a halogen-containing flame retardant. When, however, the metal hydroxide is incorporated in a large amount, the physical properties of the synthetic resins are deteriorated. It is therefore desired to develop a flame retardant aid which serves to obtain sufficient flame retardancy even when the amount of the metal hydroxide is decreased. Carbon black, red phosphorus and an acrylic fiber are known as flame retardant aids used in combination with the metal hydroxide. Carbon black colors the synthetic resins black. Red phosphorus colors the synthetic resins a reddish brown. Synthetic resins containing an acrylic fiber shows a yellowish white color immediately after they are molded, but shows poor thermal stability. As these synthetic resins are heated, they turn brownish, brown and blackish brown.

SUMMARY OF THE INVENTION

It is an object of the present invention to provide a flame retardant aid which serves to obtain sufficient flame retardancy even if the amount of metal hydroxide to be incorporated into synthetic resins is decreased, a flame retardant containing this flame retardant aid and metal hydroxide, and a flame-retardant resin composition containing this flame retardant.

It is another object of the present invention to provide a flame retardant aid capable of giving a flame-retardant resin composition having excellent color stability against heat, and a flame retardant containing this flame retardant aid.

According to the present invention, there is provided a flame retardant aid which is at least one compound selected from the group consisting of:

a composite metal compound of the formula (A),

$$Mg_{1-(x+y)}Ni_xCo_y(OH)_2 \quad (A)$$

wherein x is defined by $0 \leq x \leq 1.0$, y is defined by $0 \leq y \leq 1.0$ and x+y is defined by $0.3 \leq x+y \leq 1.0$, provided that x and y cannot be zero at the same time, a composite metal compound of the formula (B),

$$Mg_{1-(x+y)}Ni_xCo_yO \quad (B)$$

wherein x is defined by $0 \leq x \leq 1.0$, y is defined by $0 \leq y \leq 1.0$ and x+y is defined by $0.3 \leq x+y \leq 1.0$, provided that x and y cannot be zero at the same time, nickel halides, ammonium-containing salts of nickel, inorganic acid salts of nickel, and fatty acid salts of nickel.

According to the present invention, there is also provided a flame retardant containing 99.06 to 70% by weight of metal hydroxide and 0.04 to 30% by weight of the above flame retardant aid.

Further, according to the present invention, there is provided a flame-retardant resin composition containing 100 parts by weight of a synthetic resin, 60 to 300 parts by weight of metal hydroxide, and 0.1 to 20 parts by weight of at least one of the above composite metal compounds (A) and (B) and/or 0.1 to 10 parts by weight of at least one nickel compound of nickel halides, ammonium-containing salts of nickel, inorganic acid salts of nickel and fatty acid salts of nickel.

DETAILED DESCRIPTION OF THE INVENTION

The present inventors have made a diligent study to overcome the above problems, and found that a flame retardant containing the composite metal compound of the above formula (A) or (B) and/or at least one of the above nickel compounds in combination with metal hydroxide produces an excellent effect on improvement of synthetic resins in flame. Synthetic resins containing the above flame retardant also have excellent color stability against heat. Further, the flame retardant aid of the present invention can color synthetic resins in green, blue, yellow or the like without incorporating any colorant into the synthetic resins by properly selecting it from the above-described compounds (composite metal compounds of the formula (A) and (B) and nickel compounds). Further, some compounds have light colors, and synthetic resins containing such compounds can be freely colored with a colorant.

As the metal hydroxide used as a flame retardant in the present invention, preferred are aluminum hydroxide and magnesium hydroxide. Aluminum hydroxide and magnesium hydroxide may be used in combination. In view of the processability of synthetic resins and the appearance and mechanical properties of molded articles produced from the synthetic resins, the BET specific surface area of the metal hydroxide is 1 to 40 m²/g, preferably 1 to 20 m²/g, and the average particle diameter thereof is 0.1 to 20 μm, preferably 0.5 to 2 μm.

The flame retardant aid used in the present invention does not have so much influence on the processability of synthetic resins and the appearance and mechanical properties of molded articles therefrom as the metal hydroxide, since the flame retardant aid is incorporated in a smaller amount. For this reason, the average secondary particle diameter of the flame retardant aid is 100 μm or less. When it is required to achieve particularly high mechanical properties and excellent appearance of a molded article, the average secondary particle diameter is preferably 20 μm or less. Fatty acid salt of nickel is melted at a temperature at which it is kneaded with synthetic resins. It is therefore not necessary to limit the particle size of fatty acid salt of nickel. That is, fatty acid salt of nickel may have the form of a powder, beads, flakes or any others.

For mixing the metal hydroxide and flame retardant aid with the synthetic resin, the metal hydroxide and the flame retardant aid may have the form of a powder. In view of environmental safety, workability and productivity, it is preferred to use granulated metal hydroxide and granulated flame retardant aid. The amount of the metal hydroxide is 60 to 300 parts by weight per 100 parts by weight of the synthetic resin. When the amount of the metal hydroxide is less than the above lower limit, the effect on imparting flame retardancy is poor. When this amount exceeds the above upper limit, undesirably, the synthetic resin shows decreased mechanical properties.

The metal hydroxide and flame retardant aid may be surface-treated as required before they are incorporated into synthetic resins. The amount of a surface treating agent per 100 parts by weight of the flame retardant containing the metal hydroxide and flame retardant aid is generally preferably about 0.1 to 10 parts by weight. The surface treating agent preferably includes higher fatty acids such as oleic acid and stearic acid, alkali metal salts of the higher fatty acids, silane coupling agents such as vinylethoxysilane, vinyl-tris(2-methoxy)silane, gamma-methacryloxypropyltrimethoxysilane, gamma-aminopropyltrimethoxysilane, beta-(3,4-epoxycyclohexyl)ethyltrimethoxysilane, gamma-glycidoxypropyltrimethoxysilane and gamma-mercaptopropyltrimethoxysilane, titanate-containing coupling agents such as isopropyltriisostearoyl titanate, isopropyltris(dioctylpyrophosphate)titanate, isopropyltri(N-aminoethyl-aminoethyl)titanate and isopropyltridecylbenzenesulfonyl titanate, aluminum-containing coupling agents such as acetoalkoxyaluminum diisopropylate, and partially esterified products of orthophosphoric acid such as mono- or diesters from orthophosphoric acid and stearyl alcohol and partially esterified products from orthophosphoric acid or an alkali metal salt.

The composite metal compounds of the formulae (A) and (B), used in the present invention, include $Ni(OH)_2$, $Co(OH)_2$, Nio, CoO, $Mg_{0.7}Ni_{0.3}(OH)_2$, $Mg_{0.7}Co_{0.3}(OH)_2$, $Mg_{0.7}Ni_{0.3}O$, $Ni_{0.9}Co_{0.1}(OH)_2$, $Ni_{0.1}Co_{0.9}(OH)_2$, $Ni_{0.9}Co_{0.1}O$, $Ni_{0.1}Co_{0.9}O$, $Mg_{0.5}Ni_{0.49}Co_{0.01}(OH)_2$, $Mg_{0.5}Ni_{0.01}Co_{0.49}(OH)_2$, $Mg_{0.5}Ni_{0.49}Co_{0.01}O$, and $Mg_{0.5}Ni_{0.01}Co_{0.49}O$.

The nickel compound used as a flame retardant aid in the present invention includes nickel halides, ammonium-containing salts of nickel, inorganic acid salts of nickel and fatty acid salts of nickel. The nickel halides include $NiCl_2$, $NiCl_2.6H_2O$ and $NiBr_2$. The inorganic acid salts of nickel include $NiSO_4$, $NiSO_4.6H_2O$, $Ni(NO_3)_2$, $Ni(NO_3)_2.6H_2O$, $NiCO_3$, $NiCO_3.2Ni(OH)_2.4H_2O$, $Ni_3(PO_4)_2.8H_2O$, and $Ni_3(PO_4)_2.2NiHPO_4$. The ammonium-containing slats of nickel include $(NH_4)_2(NiSO_4)_2.6H_2O$ and $(NH_4)_2(NiCl_3)_2.6H_2O$. The fatty acid salts of nickel preferably include salts of saturated and unsaturated fatty acids having at least 4 carbon atoms and nickel, such as nickel stearate, nickel oleate, nickel palmirate, nickel myristate, nickel laurate, nickel caprate, nickel caprylate and nickel montanate.

The amount of the composite metal compound of the formula (A) or (B) per 100 parts by weight of the synthetic resin is preferably 0.1 to 20 parts by weight. When this amount is less than the above lower limit, the effect thereof as a flame retardant aid is insufficient. When it exceeds the above upper limit, it is uneconomical and little further effect can be obtained. The amount of the nickel compound per 100 parts by weight of the synthetic resin is preferably 0.1 to 10 parts by weight. When this amount is less than the above lower limit, the effect thereof as a flame retardant aid is insufficient. When it exceeds the above upper limit, it is uneconomical and the nickel compound may corrode a molding machine. When the nickel compound is used in an amount in the above range, the metal hydroxide such as hydrotalcite (e.g., trade name DHT-4A, supplied by Applicant Company) as a flame retardant virtually neutralizes the oxidation activity of the nickel compound, thereby causing no corrosion on a molding machine. Further, an additional amount of the metal hydroxide may be added as required to completely prevent the corrosion of a molding machine.

The composite metal compound of the formula (A) can be obtained by reacting a halide, inorganic salt or organic salt of magnesium, nickel and cobalt with an alkaline substance. $Ni(OH)_2$, $Co(OH)_2$ and $Mg(OH)_2$ have crystal structures coming under the crystal structure of $CdI_2$, and nickel, cobalt and magnesium have very similar ionic radii. Therefore, nickel, cobalt and magnesium can form a solid solution by almost freely inter-replacing one another. The composite metal compound of the formula (B) can be obtained by heating the composite metal compound (hydroxide) of the formula (A) at a temperature at which the structural water is eliminated. When it is desired to form the composite metal compound of the formula (B) for a short period of time, the heating may be carried out around 500° C. or higher.

The synthetic resin used in the present invention includes synthetic resins and synthetic rubbers such as thermoplastic resins such as polyethylene, copolymers of ethylene and other α-olefins, an ethylene/vinyl acetate copolymer, an ethylene/ethyl acrylate copolymer, an ethylene/methyl acrylate copolymer, polypropylene, copolymers of propylene and other α-olefins, polybutene-1, polystyrene, a styrene/acrylonitrile copolymer, a copolymer of styrene and ethylene-propylene-diene rubber (hereinafter referred to as EPDM), a styrene/butadiene copolymer, polyvinyl acetate, polyacrylate, polymethacrylate, polyurethane, polyester, polyether and polyamide; thermosetting resins such as a phenolic resin, a melamine resin, an epoxy resin, an unsaturated polyester resin and an alkyd resin; and synthetic rubbers such as EPDM, SBR, NBR, butyl rubber, isoprene rubber, urethane rubber and acryl rubber.

The synthetic resin, metal hydroxide and flame retardant can be mixed by any method if these components can be uniformly mixed. For example, these components can be melt-kneaded with any one of a single-screw extruder, a twin-screw extruder and a Banbury mixer. The so-obtained flame-retardant resin composition can be molded by any one of methods such as a injection molding method, an extrusion method, a blow molding method and a press-forming method.

The flame-retardant resin composition of the present invention may contain a variety of fillers, reinforcements and additives. Examples of the fillers, reinforcements and additives include an antioxidant, a metal inactivating agent, an ultraviolet light absorbing agent, a crosslinking agent, a curing agent, a foaming agent, a nucleating agent, a colorant, a glass fiber, a milled glass fiber, a glass powder, a carbon fiber, an inorganic fiber, an aromatic polyamide fiber, a metal fiber, metal flakes, a metal powder, fibrous basic magnesium sulfate, magnesium carbonate, clay, carbon black, antimony oxide and an improver for polymer alloy compatibility.

The present invention provides a flame retardant aid which serves to obtain sufficient flame retardancy even if the amount of the flame retardant is decreased, a flame retardant containing this flame retardant aid which has excellent color stability against heat, and a flame-retardant resin composition containing this flame retardant.

The present invention also provides a flame retardant containing metal hydroxide and a flame retardant aid and having excellent flame retardancy, which provides synthetic resins with a color other than conventional black and reddish brown.

Further, the resin composition containing the flame retardant aid provided by the present invention has an advantage that it can be substantially freely colored to other color when the flame retardant aid provides it with a light color.

The present invention will be detailed hereinafter by reference to Examples, in which "part" and "%" stand for "part by weight" and "% by weight", respectively, unless otherwise specified.

The secondary particle diameter values and flame retardancy values described in Examples were determined as follows.

Average particle diameter:

Composite metal compounds: An aqueous solution containing about 1% by weight of a composite metal compound was prepared, and subjected to ultrasonic dispersion treatment for 3 minutes. Immediately thereafter, the composite metal compound was measured with a microtrack (supplied by Nikkiso Co., Ltd.).

Oxides, Inorganic salts, Halides, Ammonium-containing salts: These flame retardant aids were measured by an image analyzer method using a Luzex 401 (supplied by Nihon Regulator Co., Ltd.).

Flame retardancy: Test pieces were measured according to the UL 94 flame retardant test. The larger the thickness of a test piece is, the more difficult the catching fire is. The smaller the thickness is, the easier the catching fire is. Therefore, when samples have a flame retardancy, for example, of V-0 level, a sample having a smaller thickness has higher flame retardancy than a sample having a larger thickness.

EXAMPLES 1–53

Impact-resistance polypropylene (hereinafter referred to as PP), magnesium hydroxide having a BET specific surface area of 6 $m^2/g$ and an average secondary particle diameter of 0.8 μm and surface-treated with sodium stearate, a flame retardant aid and antioxidants were preliminarily mixed in amounts as shown in Table 1, and the mixture was melt-kneaded with a twin-screw extruder at 230° C. As antioxidants, there were used DLTP (supplied by Yoshitomi Pharmaceutical Co., Ltd.) and Irganox 1010 (supplied by Ciba Geigy).

The above-kneaded product was injection-molded with an injection molding machine at 230° C. to prepare test pieces for the UL-94-VE flame retardant test and a color stability test against heat (35×25×2.1 mm). The test pieces were subjected to the UL-94-VE flame retardant test and a color stability test against heat. In the color stability test against heat, the test pieces were placed in an oven at 150° C., and visually observed on its color alteration. Table 2 shows the test results. Table A shows tie average secondary particle diameters of the flame retardants used in Examples 1 to 53.

TABLE A

| Example | Flame retardant aid | Average secondary particle diameter (μm) |
|---|---|---|
| 1, 2 | $Ni(OH)_2$ | 14 |
| 3, 4 | $Co(OH)_2$ | 12 |
| 5, 6 | NiO | 2.5 |
| 7, 8 | CoO | 5 |
| 9, 10 | $Mg_{0.7}Ni_{0.3}(OH)_2$ | 0.9 |
| 11, 12 | $Mg_{0.7}Co_{0.3}(OH)_2$ | 0.6 |
| 13, 14 | $Mg_{0.7}Ni_{0.3}O$ | 3 |
| 15, 16 | $Mg_{0.7}Co_{0.3}O$ | 3 |
| 17, 18 | $Ni_{0.9}Co_{0.1}(OH)_2$ | 2 |
| 19, 20 | $Ni_{0.1}Co_{0.9}(OH)_2$ | 2 |
| 21, 22 | $Ni_{0.9}Co_{0.1}O$ | 2 |
| 23, 24 | $Ni_{0.1}Co_{0.9}O$ | 3 |
| 25, 26 | $Mg_{0.5}Ni_{0.49}Co_{0.01}(OH)_2$ | 2 |
| 27, 28 | $Mg_{0.5}Ni_{0.01}Co_{0.49}(OH)_2$ | 2 |
| 29, 30 | $Mg_{0.5}Ni_{0.49}Co_{0.01}O$ | 3 |
| 31, 32 | $Mg_{0.5}Ni_{0.01}Co_{0.49}O$ | 3 |
| 33, 34 | $NiCO_3$ | 4 |
| 35, 36 | $NiSO_4$ | 15 |
| 37, 38 | $Ni(NO_3)_2$ | 6 |
| 39, 40 | $Ni(PO_4)_2.8H_2O$ | 8 |
| 41, 42 | $NiCl_2.6H_2O$ | 8 |
| 43, 44 | $NiBr_2$ | 5 |
| 45, 46 | $(NH_4)_2Ni(SO_4)_2.6H_2O$ | 15 |
| 47, 48 | Nickel stearate | 864 |
| 49, 50 | Nickel caprylate | 864 |
| 51, 52, 53 | NiO | 2.5 |

COMPARATIVE EXAMPLES 1–17

A composition was prepared from the same polypropylene, magnesium hydroxide and antioxidant as those used in Example 1 in amounts as shown in Table 1. Further, conventional flame retardant aids were used in Comparative Examples 9, 10 and 11. The resultant mixture was tested in the same manner as in Example 1. Table 2 shows the results.

The flame retardant aids used in Comparative Examples 9, 10 and 11 were as follows.

Comparative Example 9: Carbon black, prepared by an oil furnace method. Average secondary particle diameter 42 mm, a specific surface area 43 $m^2/g$.

Comparative Example 10: Red phosphorus (Novared #120, supplied by Rinkagaku Kogyo Co., Ltd.), average secondary particle diameter 25 μm.

Comparative Example 11: Acryl fiber obtained by copolymerizing acrylonitrile and vinyl acetate, a diameter 1.2 denier, length 1.5 mm.

EXAMPLE 54 AND COMPARATIVE EXAMPLE 18

A high-density polyethylene (hereinafter referred to as HDPE, density 0.954), nickel oxide (the same as the nickel oxide used in Example 5), DLTP and Irganox 1010 were mixed in amounts shown in Table 1. The mixture was melt-kneaded with a twin-screw extruder at 250° C., and the so-prepared kneaded mixture was injection-molded at 250°

C. in the same manner as in Example 1 to prepare test pieces. The test pieces were subjected to the flame retardant test and the color stability test against heat. The color stability test against heat was carried out at 80° C. Table 2 shows the results.

EXAMPLE 55 AND COMPARATIVE EXAMPLE 19

A low-density polyethylene (hereinafter referred to as LDPE, density 0.918), aluminum hydroxide having an average secondary particle diameter of 1.0 μm, nickel oxide (the same as the nickel oxide used in Example 5), DLTP and Irganox 1010 were mixed in amounts shown in Table 1. The mixture was melt-kneaded with a twin-screw extruder at 260° C., and the so-prepared kneaded mixture was injection-molded at 260° C. in the same manner as in Example 1 to prepare test pieces. The test pieces were subjected to the flame retardant test and the color stability test against heat. The color stability test against heat was carried out at 60° C. Table 2 shows the results.

TABLE 1

|  | Magnesium hydroxide (part) | Flame retardant aid | (part) | Antioxidants | |
|---|---|---|---|---|---|
|  |  | % Amount |  | DLTP (part) | Irganox (part) |
| Ex. 1 | 129.5 | $Ni(OH)_2$ | 0.5 | 0.25 | 0.25 |
| Ex. 2 | 115 | $Ni(OH)_2$ | 10 | 0.25 | 0.25 |
| Ex. 3 | 129.5 | $Co(OH)_2$ | 0.5 | 0.25 | 2.5 |
| Ex. 4 | 115 | $Co(OH)_2$ | 10 | 0.25 | 2.5 |
| Ex. 5 | 124.5 | NiO | 0.5 | 0.25 | 0.25 |
| Ex. 6 | 103 | NiO | 10 | 0.25 | 0.25 |
| Ex. 7 | 124.5 | CoO | 0.5 | 0.25 | 2.5 |
| Ex. 8 | 103 | CoO | 10 | 0.25 | 2.5 |
| Ex. 9 | 129.5 | $Mg_{0.7}Ni_{0.3}(OH)_2$ | 0.5 | 0.25 | 0.25 |
| Ex. 10 | 115 | $Mg_{0.7}Ni_{0.3}(OH)_2$ | 10 | 0.25 | 0.25 |
| Ex. 11 | 129.5 | $Mg_{0.7}Co_{0.3}(OH)_2$ | 0.5 | 0.25 | 2.5 |
| Ex. 12 | 115 | $Mg_{0.7}Co_{0.3}(OH)_2$ | 10 | 0.25 | 2.5 |
| Ex. 13 | 124.5 | $Mg_{0.7}Ni_{0.3}O$ | 0.5 | 0.25 | 0.25 |
| Ex. 14 | 103 | $Mg_{0.7}Ni_{0.3}O$ | 10 | 0.25 | 0.25 |
| Ex. 15 | 124.5 | $Mg_{0.7}Co_{0.3}O$ | 0.5 | 0.25 | 2.5 |
| Ex. 16 | 103 | $Mg_{0.7}Co_{0.3}O$ | 10 | 0.25 | 2.5 |
| Ex. 17 | 129.5 | $Ni_{0.9}Co_{0.1}(OH)_2$ | 0.5 | 0.25 | 2.5 |
| Ex. 18 | 115 | $Ni_{0.9}Co_{0.1}(OH)_2$ | 10 | 0.25 | 2.5 |
| Ex. 19 | 129.5 | $Ni_{0.1}Co_{0.9}(OH)_2$ | 0.5 | 0.25 | 2.5 |
| Ex. 20 | 115 | $Ni_{0.1}Co_{0.9}(OH)_2$ | 10 | 0.25 | 2.5 |
| Ex. 21 | 124.5 | $Ni_{0.9}Co_{0.1}O$ | 0.5 | 0.25 | 2.5 |
| Ex. 22 | 103 | $Ni_{0.9}Co_{0.1}O$ | 10 | 0.25 | 2.5 |
| Ex. 23 | 124.5 | $Ni_{0.1}Co_{0.9}O$ | 0.5 | 0.25 | 2.5 |
| Ex. 24 | 124.5 | $Ni_{0.1}Co_{0.9}O$ | 10 | 0.25 | 2.5 |
| Ex. 25 | 129.5 | $Mg_{0.5}Ni_{0.49}Co_{0.01}(OH)_2$ | 0.5 | 0.25 | 2.5 |
| Ex. 26 | 115 | $Mg_{0.5}Ni_{0.49}Co_{0.01}(OH)_2$ | 10 | 0.25 | 2.5 |
| Ex. 27 | 129.5 | $Mg_{0.5}Ni_{0.01}Co_{0.49}(OH)_2$ | 0.5 | 0.25 | 2.5 |
| Ex. 28 | 115 | $Mg_{0.5}Ni_{0.01}Co_{0.49}(OH)_2$ | 10 | 0.25 | 2.5 |
| Ex. 29 | 124.5 | $Mg_{0.5}Ni_{0.49}Co_{0.01}O$ | 0.5 | 0.25 | 2.5 |
| Ex. 30 | 103 | $Mg_{0.5}Ni_{0.49}Co_{0.01}O$ | 10 | 0.25 | 2.5 |
| Ex. 31 | 124.5 | $Mg_{0.5}Ni_{0.01}Co_{0.49}O$ | 0.5 | 0.25 | 2.5 |
| Ex. 32 | 103 | $Mg_{0.5}Ni_{0.01}Co_{0.49}O$ | 10 | 0.25 | 2.5 |
| Ex. 33 | 129.5 | $NiCO_3$ | 0.5 | 0.25 | 0.25 |
| Ex. 34 | 103 | $NiCO_3$ | 10 | 0.25 | 2.5 |
| Ex. 35 | 129.5 | $NiSO_4$ | 0.5 | 0.25 | 0.25 |
| Ex. 36 | 105 | $NiSO_4$ | 10 | 0.25 | 2.5 |
| Ex. 37 | 129.5 | $Ni(NO_3)_2$ | 0.5 | 0.25 | 0.25 |
| Ex. 38 | 105 | $Ni(NO_3)_2$ | 10 | 0.25 | 2.5 |
| Ex. 39 | 129.5 | $Ni(PO_4)_2.8H_2O$ | 0.5 | 0.25 | 0.25 |
| Ex. 40 | 105 | $Ni(PO_4)_2.8H_2O$ | 10 | 0.25 | 2.5 |
| Ex. 41 | 129.5 | $NiCl_2.6H_2O$ | 0.5 | 0.25 | 0.25 |
| Ex. 42 | 105 | $NiCl_2.6H_2O$ | 10 | 0.25 | 2.5 |
| Ex. 43 | 129.5 | $NiBr_2$ | 0.5 | 0.25 | 0.25 |
| Ex. 44 | 105 | $NiBr_2$ | 10 | 0.25 | 2.5 |
| Ex. 45 | 129.5 | $(NH_4)_2Ni(SO_4)_2.6H_2O$ | 0.5 | 0.25 | 0.25 |
| Ex. 46 | 105 | $(NH_4)_2Ni(SO_4)_2.6H_2O$ | 10 | 0.25 | 2.5 |
| Ex. 47 | 129.5 | Nickel stearate | 0.5 | 0.25 | 0.25 |
| Ex. 48 | 105 | Nickel stearate | 5 | 0.25 | 2.5 |
| Ex. 49 | 129.5 | Nickel caprylate | 0.5 | 0.25 | 0.25 |
| Ex. 50 | 105 | Nickel caprylate | 5 | 0.25 | 2.5 |
| Ex. 51 | 87 | NiO | 3 | 0.25 | 0.25 |
| Ex. 52 | 157 | NiO | 3 | 0.25 | 0.25 |
| Ex. 53 | 217 | NiO | 3 | 0.25 | 0.25 |
| Ex. 54 | 127 | NiO | 3 | 0.25 | 0.25 |
| Ex. 55 | Aluminum hydroxide 127 | NiO | 3 | 0.25 | 0.25 |
| CEx. 1 | 113 |  |  | 0.25 | 0.25 |
| CEx. 2 | 113 |  |  | 0.25 | 2.5 |
| CEx. 3 | 125 |  |  | 0.25 | 0.25 |
| CEx. 4 | 125 |  |  | 0.25 | 2.5 |
| CEx. 5 | 130 |  |  | 0.25 | 0.25 |
| CEx. 6 | 130 |  |  | 0.25 | 2.5 |

TABLE 1-continued

| | Magnesium hydroxide (part) | Flame retardant aid % Amount | (part) | Antioxidants DLTP (part) | Irganox (part) |
|---|---|---|---|---|---|
| CEx. 7 | 150 | | | 0.25 | 0.25 |
| CEx. 8 | 150 | | | 0.25 | 2.5 |
| CEx. 9 | 122 | Carbon black | 3 | 0.25 | 0.25 |
| CEx. 10 | 112 | Red phosphorus | 13 | 0.25 | 2.25 |
| CEx. 11 | 122 | Acryl fiber | 3 | 0.25 | 0.25 |
| CEx. 12 | 125 | | | 0.25 | 0.25 |
| CEx. 13 | 90 | | | 0.25 | 0.25 |
| CEx. 14 | 200 | | | 0.25 | 0.25 |
| CEx. 15 | 160 | | | 0.25 | 0.25 |
| CEx. 16 | 250 | | | 0.25 | 0.25 |
| CEx. 17 | 220 | | | 0.25 | 0.25 |
| CEx. 18 | 130 | | | 0.25 | 0.25 |
| CEx. 19 | Aluminum hydroxide 127 | | | 0.25 | 0.25 |

Ex. = Example,
CEx = Comparative Example
Note 1:
The amounts of magnesium hydroxide, flame retardant aids and antioxidants in Examples 1 to 53 and Comparative Examples 1 to 17 = part per 100 parts by weight of polyproplyene.
Note 2:
The amounts of magnesium hydroxide, flame retardant aids and antioxidants in Example 54 and Comparative Example 18 = part per 100 parts by weight of HDPE.
Note 3:
The amounts of magnesium hydroxide, flame retardant aids and antioxidants in Example 55 and Comparative Example 19 = part per 100 parts by weight of LDPE.

TABLE 2

| | Flame retardancy | Color stability against heat Not heated | 2nd day | 10th day |
|---|---|---|---|---|
| Ex. 1 | V-1 | light bluish white | unchanged | unchanged |
| Ex. 2 | V-0 | light blue | unchanged | unchanged |
| Ex. 3 | V-1 | light reddish brown | unchanged | unchanged |
| Ex. 4 | V-0 | reddish brown | unchanged | unchanged |
| Ex. 5 | V-0 | light greenish white | unchanged | unchanged |
| Ex. 6 | V-0 | green | unchanged | unchanged |
| Ex. 7 | V-0 | grayish black | unchanged | unchanged |
| Ex. 8 | V-0 | black | unchanged | unchanged |
| Ex. 9 | V-1 | light greenish white | unchanged | unchanged |
| Ex. 10 | V-0 | light green | unchanged | unchanged |
| Ex. 11 | V-1 | light reddish brown | unchanged | unchanged |
| Ex. 12 | V-0 | reishi brown | unchanged | unchanged |
| Ex. 13 | V-0 | light greenish white | unchanged | unchanged |
| Ex. 14 | V-0 | green | unchanged | unchanged |
| Ex. 15 | V-0 | grayish black | unchanged | unchanged |
| Ex. 16 | V-0 | black | unchanged | unchanged |
| Ex. 17 | V-1 | light greenish white | unchanged | unchanged |
| Ex. 18 | V-0 | green | unchanged | unchanged |
| Ex. 19 | V-1 | light reddish brown | unchanged | unchanged |
| Ex. 20 | V-0 | reddish brown | unchanged | unchanged |
| Ex. 21 | V-0 | light greenish white | unchanged | unchanged |
| Ex. 22 | V-0 | green | unchanged | unchanged |
| Ex. 23 | V-0 | light grayish black | unchanged | unchanged |
| Ex. 24 | V-0 | grayish black | unchanged | unchanged |
| Ex. 25 | V-1 | light greenish white | unchanged | unchanged |
| Ex. 26 | V-0 | green | unchanged | unchanged |
| Ex. 27 | V-1 | light reddish brown | unchanged | unchanged |
| Ex. 28 | V-0 | reddish brown | unchanged | unchanged |
| Ex. 29 | V-0 | light greenish white | unchanged | unchanged |
| Ex. 30 | V-0 | green | unchanged | unchanged |
| Ex. 31 | V-0 | light grayish black | unchanged | unchanged |
| Ex. 32 | V-0 | grayish black | unchanged | unchanged |
| Ex. 33 | V-1 | light greenish white | unchanged | unchanged |
| Ex. 34 | V-1 | light green | unchanged | unchanged |
| Ex. 35 | V-1 | light yellowish white | unchanged | unchanged |
| Ex. 36 | V-1 | light yellowish white | unchanged | unchanged |
| Ex. 37 | V-1 | light yellowish white | unchanged | unchanged |
| Ex. 38 | V-1 | light yellowish white | unchanged | unchanged |
| Ex. 39 | V-1 | light yellowish white | unchanged | unchanged |
| Ex. 40 | V-1 | light yellowish white | unchanged | unchanged |
| Ex. 41 | V-1 | light greenish white | unchanged | unchanged |
| Ex. 42 | V-1 | light yellowish white | unchanged | unchanged |
| Ex. 43 | V-1 | light brownish white | unchanged | unchanged |
| Ex. 44 | V-1 | light yellowish brown | unchanged | unchanged |
| Ex. 45 | V-1 | light reddish green white | unchanged | unchanged |
| Ex. 46 | V-1 | light reddish green white | unchanged | unchanged |
| Ex. 47 | V-1 | light greenish white | light yellowish white | |
| Ex. 48 | V-1 | light greenish white | light yellowish white | |
| Ex. 49 | V-1 | light greenish white | light yellowish white | |
| Ex. 50 | V-1 | light greenish white | light yellowish white | |
| Ex. 51 | V-0 | green | unchanged | unchanged |
| Ex. 52 | V-0 | green | unchanged | unchanged |
| Ex. 53 | V-0 | green | unchanged | unchanged |
| Ex. 54 | V-1 | green | unchanged | unchanged |
| Ex. 55 | V-1 | green | unchanged | unchanged |
| CEx. 1 | HB | white | light yellowish white | |
| CEx. 2 | HB | white | light yellowish white | |
| CEx. 3 | HB | white | light yellowish white | |
| CEx. 4 | HB | white | light yellowish white | |
| CEx. 5 | HB | white | light yellowish white | |
| CEx. 6 | HB | white | light yellowish white | |
| CEx. 7 | V-0 | white | light yellowish white | |
| CEx. 8 | V-0 | white | light yellowish white | |
| CEx. 9 | V-0 | black | unchanged | unchanged |
| CEx. 10 | V-0 | reddish brown | unchanged | unchanged |

TABLE 2-continued

| | Flame retardancy | Color stability against heat | | |
|---|---|---|---|---|
| | | Not heated | 2nd day | 10th day |
| CEx. 11 | V-0 | light yellowish white | light brown | blackish brown |
| CEx. 12 | V-0 | white | | light yellowish white |
| CEx. 13 | HB | white white | | light yellowish white |
| CEx. 14 | V-0 | white white | | light yellowish white |
| CEx. 15 | HB | white white | | light yellowish white |
| CEx. 16 | V-0 | white white | | light yellowish white |
| CEx. 17 | HB | white white | | light yellowish white |
| CEx. 18 | HB | white | unchanged | unchanged |
| CEx. 19 | HB | white | unchanged | unchanged |

Notes:
Ex. = Example,
CEx. = Comparative Example
1. The color stability test against heat in Examples 1–53 and Comparative Examples 1–17 was carried out in a gear oven at 150° C.
2. The UL94VE flame retardant test in Examples 1–50, 54 and 55 and Comparative Examples 1–11, 18 and 19 was carried out on test pieces having a thickness of ⅛ inch.
3. The UL94VE flame retardant test in Example 51 and Comparative Examples 12 and 13 was carried out on test pieces having a thickness of ¼ inch.
4. The UL94VE flame retardant test in Example 52 and Comparative Examples 14 and 15 was carried out on test pieces having a thickness of ¹⁄₁₆ inch.
5. The UL94VE flame retardant test in Example 53 and Comparative Examples 16 and 17 was carried out on test pieces having a thickness of ¹⁄₃₂ inch.
6. The color stability test against heat in Example 54 and Comparative Example 18 was carried out in a gear oven at 80° C.
7. The color stability test against heat in Example 55 and Comparative Example 19 was carried out in a gear oven at 60° C.

What is claimed is:

1. A flame-retardant halogen-free resin composition comprising:

(a) 100 parts by weight of a halogen-free synthetic resin, (b) 60 to 300 parts by weight of magnesium hydroxide or aluminum hydroxide, and (c) 0.1 to 20 parts by weight of at least one compound selected from the group consisting of:

a composite metal compound of the formula (A), $$Mg_{1-(x+y)}Ni_xCo_y(OH)_2 \qquad (A)$$

wherein x is defined by $0.3 \leq x+y \leq 1.0$, y is defined by $0 \leq y \leq 1.0$ and x+y is defined by $0.3 \leq x+y \leq 1.0$, provided that x and y cannot be zero at the same time, and a composite metal compound of the formula (B), $$Mg_{1-(x+y)}Ni_xCo_yO \qquad (B)$$

wherein x is defined by $0 \leq x \leq 0.9$, y is defined by $0.1 \leq y \leq 1.0$ and x+y is defined by $0.3 \leq x+y \leq 1.0$, provided that x and y cannot be zero at the same time.

2. A flame-retardant halogen-free resin composition according to claim 1, wherein the aluminum hydroxide or magnesium hydroxide has a BET specific surface area of 1 to 40 m²/g and an average particle diameter of 0.1 to 20 μm.

3. A method of making a flame-retardant halogen-free resin composition comprising the steps of:

mixing component (a), component (b) and component (c), wherein component (a) is 100 parts by weight of a halogen-free synthetic resin, component (b) is 60 to 300 parts by weight of magnesium hydroxide or aluminum hydroxide, and component (c) is 0.1 to 20 parts by weight of at least one compound selected from the group consisting of:

a composite metal compound of the formula (A), $$Mg_{1-(x+y)}Ni_xCo_y(OH)_2 \qquad (A)$$

wherein x is defined by $0 \leq x \leq 1.0$, y is defined by $0 \leq y \leq 1.0$ and x+y is defined by $0.3 \leq x+y \leq 1.0$, provided that x and y cannot be zero at the same time, and a composite metal compound of the formula (B), $$Mg_{1-(x+y)}Ni_xCo_yO \qquad (B)$$

wherein x is defined by $0 \leq x \leq 0.9$, y is defined by $0.1 \leq y \leq 1.0$ and x+y is defined by $0.3 \leq x+y \leq 1.0$, provided that x and y cannot be zero at the same time.

4. The method according to claim 3, wherein the aluminum hydroxide or magnesium hydroxide has a BET specific surface area of 1 to 40 m²/g and an average particle diameter of 0.1 to 20 μm.

5. A method of increasing the flame retardancy of a flame retardant halogen-free resin composition comprising a halogen-free resin and magnesium hydroxide or aluminum hydroxide while enabling the amount of magnesium hydroxide or aluminum hydroxide to be reduced, which comprises the step of incorporating into the composition a flame retardant aid being at least one compound selected from the group consisting of:

a composite metal compound of the formula (A), $$Mg_{1-(x+y)}Ni_xCo_y(OH)_2 \qquad (A)$$

wherein x is defined by $0 \leq x \leq 1.0$, y is defined by $0. \leq y \leq 1.0$ and x+y is defined by $0.3 \leq x+y \leq 1.0$, provided that x and y cannot be zero at the same time, and a composite metal compound of the formula (B), $$Mg_{1-(x+y)}Ni_xCo_yO \qquad (B)$$

wherein x is defined by $0 \leq x \leq 0.9$, y is defined by $0.1 \leq y \leq 1.0$ and x+y is defined by $0.3 \leq x+y \leq 1.0$, provided that x and y cannot be zero at the same time.

\* \* \* \* \*

UNITED STATES PATENT AND TRADEMARK OFFICE
CERTIFICATE OF CORRECTION

PATENT NO. : 5,583,172
DATED : December 10, 1996
INVENTOR(S) : TAKESHI IMAHASHI, AKIRA OKADA, TOMOKO ABE It is certified that error appears in the above-identified patent and that said Letters Patent is hereby corrected as shown below:

Claim 1, line 10, change "$0.3 \leq x+y \leq 1.0$" to read -- $0 \leq x \leq 1.0$ --.

Signed and Sealed this

Second Day of June, 1998

Attest:

BRUCE LEHMAN

Attesting Officer

Commissioner of Patents and Trademarks